May 14, 1929.  C. A. MATSON  1,713,392
REVERSE BRAKE
Filed Oct. 18, 1927  4 Sheets-Sheet 1
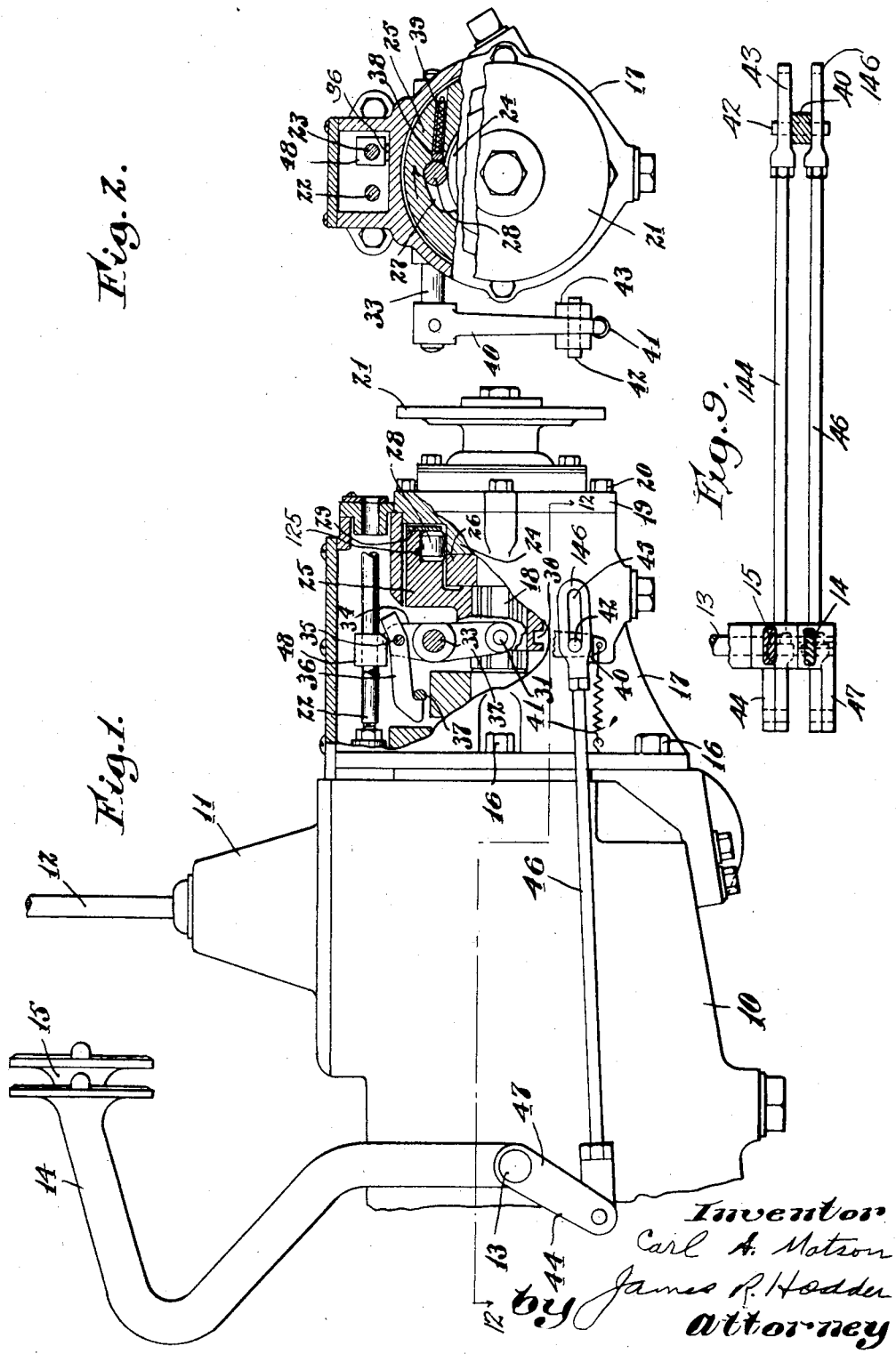
Inventor
Carl A. Matson
by James R. Hodder
Attorney

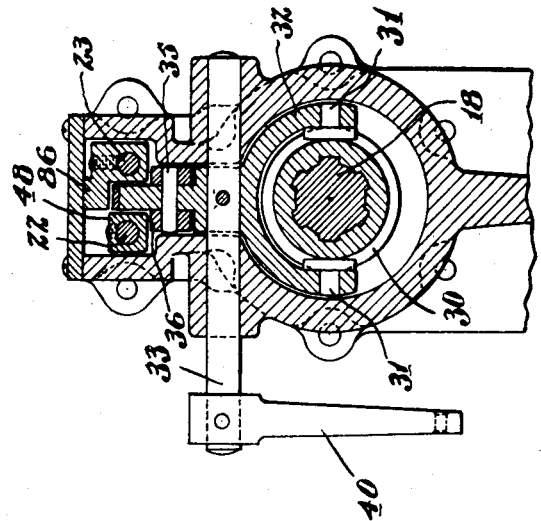
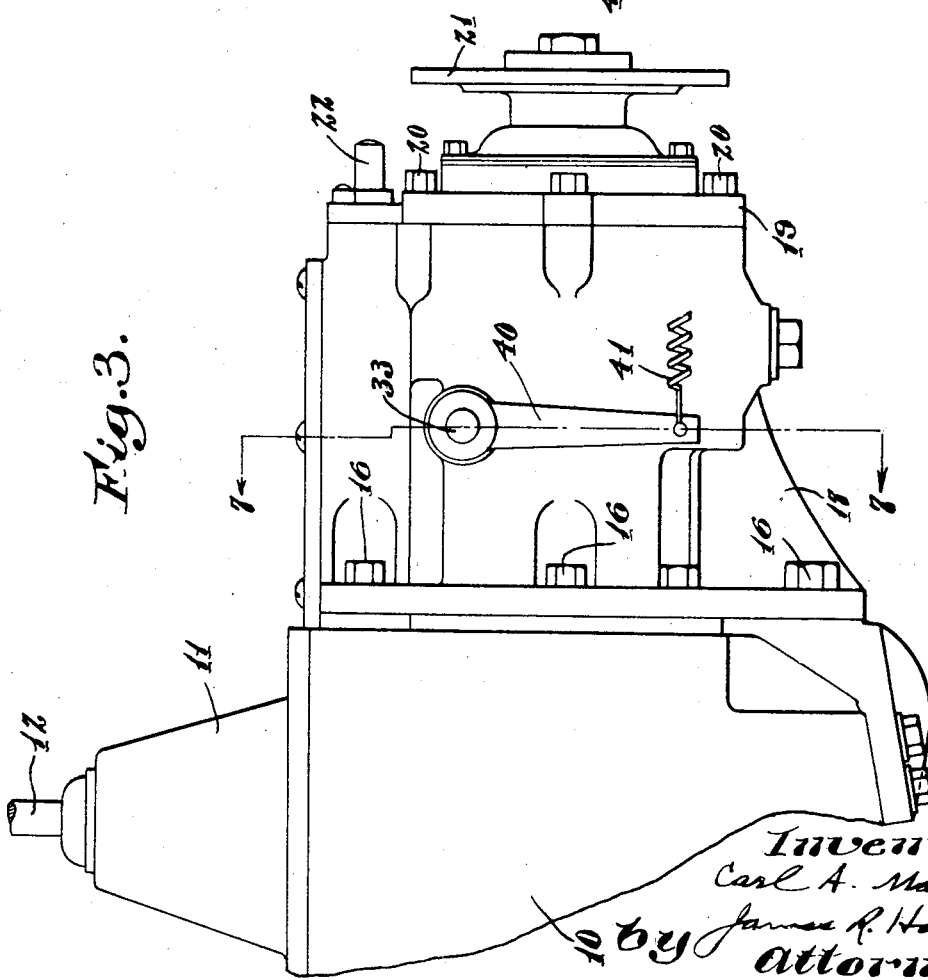

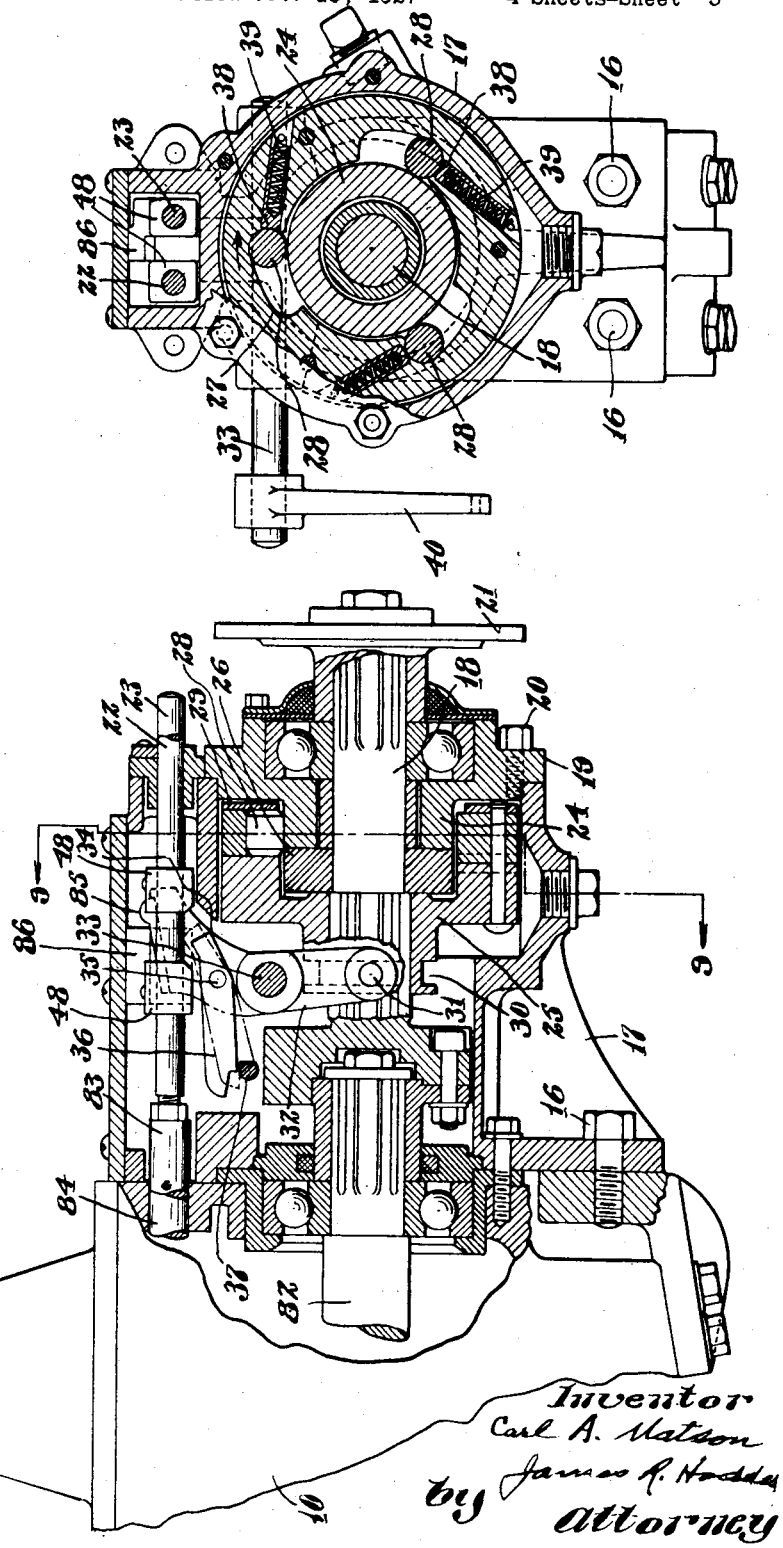

May 14, 1929.   C. A. MATSON   1,713,392
REVERSE BRAKE
Filed Oct. 18, 1927   4 Sheets-Sheet 4
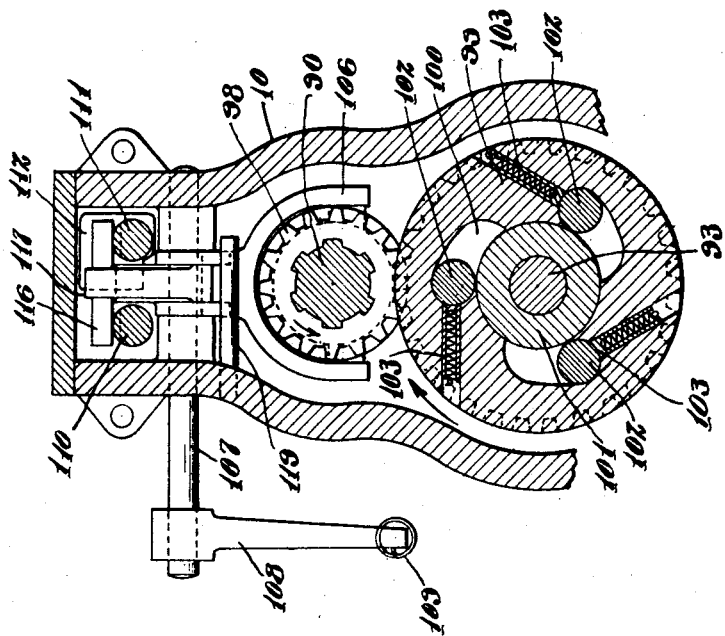
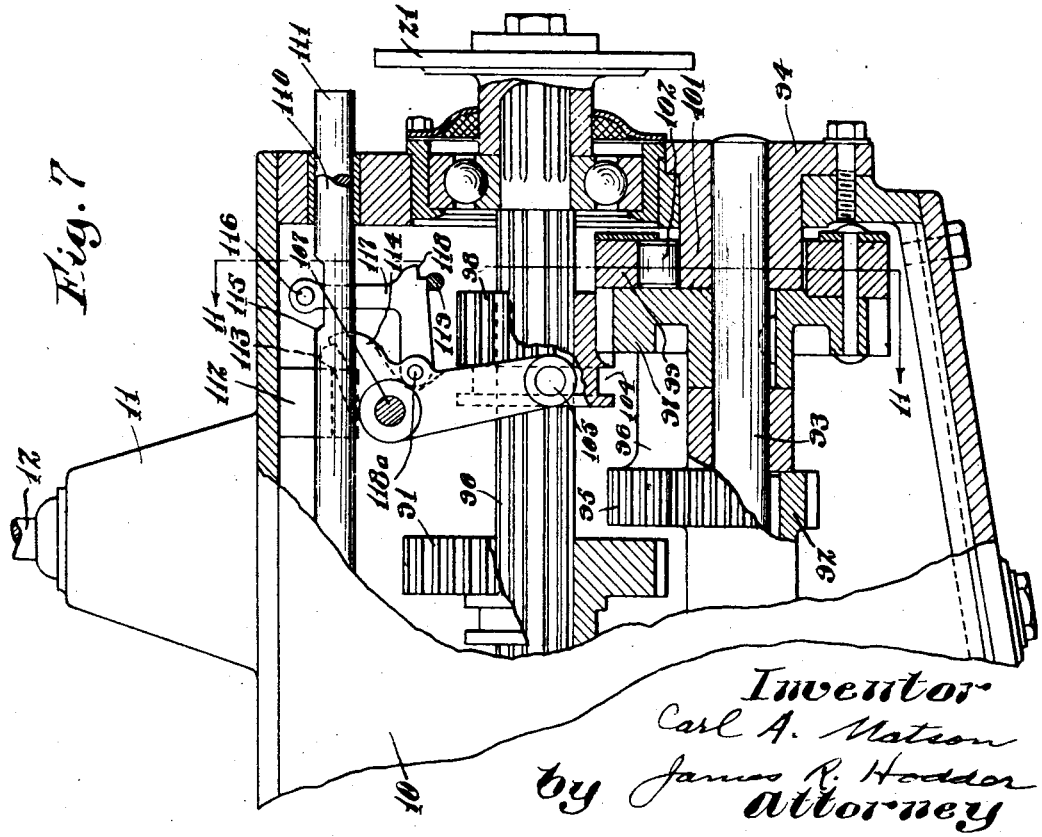
Inventor
Carl A. Matson
by James R. Hodder
Attorney Patented May 14, 1929.

1,713,392

UNITED STATES PATENT OFFICE.

CARL A. MATSON, OF LYNNFIELD, MASSACHUSETTS.

REVERSE BRAKE.

Application filed October 18, 1927. Serial No. 226,970.

My present invention relates to power transmission systems, and more particularly to an improved brake mechanism for the transmission systems of automobiles or other motor driven vehicles.

In the present day automobile, a serious difficulty arises when it is necessary to start the vehicle in motion after having been stopped on an upgrade and this is particularly true if, when in this situation, there is considerable traffic in the road and another vehicle in close proximity in the rear. Due to the relatively great weight of the average automobile, there is a pronounced tendency to roll down the hill and considerable skill is required to prevent the same and at the same time connect the power mechanism to the driving wheels so as to move the vehicle ahead and failure to do this, such as the driver releasing the foot brake to accelerate the engine prior to letting in the clutch is to cause the vehicle to roll backward with a possible collision to the car in the rear. Practically the only way at present available in which the car can be started under these conditions is to set the emergency brake, release the foot brake, accelerate the engine, let in the clutch while simultaneously and gradually letting out or releasing the emergency brake. This operation requires considerable skill and is not always feasible.

In my copending application, Serial No. 190,754, filed May 12, 1927, for automatic reverse brake, I have described and claimed an improved device capable of attachment to or incorporation in the transmission system of an automobile, whereby undesired rearward movement of an automobile or other like vehicle may be prevented and by means of which the operator of such vehicle may pay attention strictly to the problem of putting his car in motion and without giving any thought whatever to a possible rearward movement thereof.

In practically applying the invention referred to in the copending application, I have devised other means for accomplishing the same purpose and the present invention is the result of such work. In my present invention I have devised means which may be operated by the emergency brake lever or by the foot clutch or foot brake, and which will act to place the transmission mechanism in such condition upon stopping as to prevent positively any undesired rearward movement of the vehicle to which it is applied, and, which, when it is desired to reverse the motion of the car, places the mechanism in position where such may be accomplished as readily as if the car were not equipped with a reverse brake.

The principal object of my invention, therefore, is a reverse brake mechanism for automobiles and the like.

Other objects and novel features of the construction and arrangement of parts comprising the device will appear as the description of the invention progresses.

In the accompanying drawings illustrating preferred embodiments of my invention, Fig. 1 is a side elevation partly in section;

Fig. 2 is an end elevation partly in section;

Fig. 3 is a side elevation of a modification;

Fig. 4 is a sectional elevation on the line 7—7 of Fig. 3;

Fig. 5 is a longitudinal sectional view of a portion of Fig. 3;

Fig. 6 is a sectional elevation on the line 9—9 of Fig. 5;

Fig. 7 is a sectional elevation of another modification;

Fig. 8 is a sectional end elevation on the line 11—11 of Fig. 7, and

Fig. 9 is a section on the line 12—12 of Fig. 1.

Referring to the drawings, and particularly to Figs. 1 and 2, 10 designates a transmission case of an automobile having a top 11 thereon, in which is pivotally mounted the usual operating lever 12 for operating the transmission gearing. As a part of the transmission gearing, there is a shaft 13 to which is secured a clutch lever 14 and on which is rotatably mounted a brake lever 15. Attached to the rear of the transmission casing 10 by bolts 16 is a casing 17 in which is rotatably mounted one end of an extension 18 of the usual power shaft, such casing being closed at its rear end by a cover plate 19 secured thereto by bolts 20 and on the end of the power shaft 18 is secured the usual flange 21 and by means of which the power shaft 18 may be connected either directly or indirectly to the usual propeller shaft. Also slidably mounted in the casing 17 are rods 22 and 23, which rods are connected to and form extensions of the rods operated by the operating lever 12 as the transmission device is controlled. Extending inwardly from the cover 19 and forming a part thereof, while surrounding the propeller shaft 18 is a cylindrical member 24. Slidably mounted on the propeller shaft extension 18, while rotatable therewith, is a member 25 and on the power shaft extension 18 between the member 24 and 25 is located a member 26 that is loosely rotatable on the extension 18. The member 25 is recessed at 125 and in this recess is located the member 26 and such member 25 is provided on its rear face with a plurality of recesses 27, such recesses being tapered and in each recess is located a roller 28. The rollers 28 are retained in the tapered recesses 27 by an annular plate 29. The member 25 is drilled adjacent to each tapered recess 27 to receive a plunger 38, with which co-operates a spring 39 and which plunger 38 and spring 39 tend to move the rollers 28 in the recesses 27 and toward the tapered end thereof. The forward end of the member 25 is reduced in diameter and is provided with an annular groove 30 in which fit projecting pins 31 on a forked shaped member 32 that is secured to a transversely mounted shaft 33 in the casing 17. Also secured to the shaft 33 within the casing 17 is an arm 34 provided with a shaft 35 on which is rotatably mounted a latch 36. This latch 36 extends forwardly and is adapted to engage with a pin 37 secured to the casing 17. The shaft 33 has one end thereof extending outwardly from the casing 17 and to the outer end is secured a lever 40. To the lower end of the lever 40 is attached one end of a spring 41, the other end of this spring being attached to the forward flange on the casing 17. Also adjacent the lower end of the lever 40 is secured a shaft or pin 42, which shaft or pin extends laterally outward from each side thereof and through a slot in the rear end of a link 43. The forward end of this link is attached to the rear end of a connecting rod 144 that has its front end pivotally attached to a downward extension 44 of the brake lever 15. The other lateral extension of the pin shaft 42 engages in a slot 45 in the end of a link 146 attached to the rear end of a connecting rod 46, which connecting rod has its front end pivotally attached to the lower end of an extension 47 of the clutch lever 14. The spring 41 normally tends to move the member 25 forwardly on the power shaft extension 18 so as to bring the rollers 28 forward and into position on top of the member 26 but is prevented from doing so by the latch 36 engaging with the pin 37. Therefore, normally the rollers 28 are in the position shown in Figs. 1 and 2 or in position to have the rollers 28 move into the tapered end of the recesses 27, or, in other words, into position to cause a gripping action between the rotatable member 25 and the stationary member 24 when such rotatable member 25 rotates in a clockwise direction, as viewed in Fig. 2, or in the direction it would rotate were the automobile of which it forms a part to move rearwardly. Therefore, with the parts in the position shown, the automobile will be prevented from having imparted thereto a reverse motion. Secured to the reverse rod 23 is an operating block 48, the function of this block being to engage with the end of the latch 36 and release the same from the rod 37. Therefore, when the lever 12 is operated to place the transmission gearing in reverse the block 48 engages with the free end of the latch 36, removing the same from the rod 37 and the spring 41 thereupon will slide the member 25 forward and bring the rollers 28 out of possible engagement with the fixed member 24 and into position over or on top of the member 26. When the gearing of the transmission contained in the transmission casing 10 is moved into neutral, the spring 41 will tend to move the member 25 and associated parts to the left, as viewed in Fig. 1 to bring the roller 28 out of possible engagement with the fixed member 24 and, therefore, there can be no clutching or braking action between the members 25 and 24. Should the operator press either or both the clutch lever 14 or brake lever 15, the links 43 and 146 will engage with the transverse portions of the rod or shaft 42 and will rotate the shaft 33 so as to cause a rearward movement of the member 25 into position to bring the rollers 28 into association with the fixed member 24 and to slide the latch 36 over into locking position with respect to the rod 37. This action will lock the rollers 28 in possible braking or clutching position with respect to the members 25 and 24 and, therefore, it is obvious that if at this moment the vehicle to which the device is attached starts to roll rearwardly a rotation of the member 25 in a clockwise direction will cause a clutching action to take place between such member 25 and member 24 by reason of rollers 28 moving into the tapered recesses 27.

Referring now to Figs. 3, 4, 5 and 6, there is shown that modification of my device wherein the reverse brake mechanism is controlled by the gear shift mechanism and in which the reverse gear is normally held in operative position under spring tension.

In this modification, 10 designates the transmission casing having mounted on the top thereof the cover 11 in which is pivotally mounted the gearing control lever 12 and secured to the rear face of the casing 10 by bolts 16 is the casing 17. Within the casing 10 and forming part of the transmission mechanism is the power shaft 82 on the rear end of which is secured an auxiliary power or jack shaft 18, which jack shaft is journaled in suitable bearings in the casing 17. Secured to the rear of the casing 17 is a member 19 by means of bolts 20 and secured to the end of the jack shaft 18 is a flange 21, by means of which the power shaft 82 may be connected to the usual propeller shaft of the automobile. Forming part of the transmission mechanism within the casing 10 are rods 83 and 84 and secured to the ends of such rods 83 and 84 and slidably mounted in the casing 17, or associated members, are rods 22 and 23. Formed integral with and extending forward from the member 19 and surrounding the jack shaft 18 is a cylindrical member 24, while slidably mounted on the jack shaft 18 in front of the member 24 is a cylindrical member 25 recessed to receive a member 26 loosely mounted on the jack shaft 18. The member 25 is recessed at a plurality of points, as indicated at 27, and in such recessed portions loosely fit rollers 28, the recessed portions 27 forming with the exterior portion of the member 24 wedge-shaped recesses in which fit the rollers 28. An annular plate or disc 29 is employed to hold the rollers 28 in the recesses 27. The forward end of the member 25 is reduced in diameter and has formed therein an annular groove 30 in which fits inwardly extending pins 31 secured to the lower end of a fork-shaped member 32 that is secured to a shaft 33 rotatably mounted in suitable bearings in the casing 17. Secured to the shaft 33 and extending upwardly therefrom is an arm 34 and in such arm 34 is a rod or shaft 35 on which is rotatably mounted a latch 36. Also attached to the upper end of the arm 34 is a throw-out cam member 85. The member 25 is drilled at a plurality of points to receive plungers 38 that have associated therewith springs 39, and which springs tend to force the plungers 38 into engagement with the rollers 28 and force such rollers to the left, as viewed in Fig. 6 or into position where the same engage with the outer periphery of the member 24 and the walls of the recesses 27. The shaft 33 extends outwardly at one end from the casing 17 and secured to this end is one end of a lever 40. Secured to the lower or free end of the lever 40 is one end of a coil spring 41, the other end of such spring being attached to any convenient portion of the casing 17, and in such a manner that the shaft 33 will have a tendency to rotate in a counter-clockwise direction and thus force the member 25 into position to bring the rollers 28 in the recesses 27 into operative relation with respect to the member 24. At this time the latch 36 is in the position shown in full lines in Fig. 5, that is right on top of a pin or bar 37 mounted in the casing 17. Secured to the rods 22 and 23 are unlocking cam dogs 48, which, as the gear operating lever 12 is operated, move into engagement with the latch 36 and insure the lifting of the same out of any possible engagement with the bar or rod 37 and thus, when the gearing contained in the transmission case 10 is in action in either the first, second, or third forward speeds, the rollers 28 will always be in position to exert a braking action on the jack shaft 18 to prevent the same rotating to allow the automobile to move rearwardly. The rod 23, which is assumed to be the rod operated when the gear operating lever 12 is controlled to place the reverse gears in the casing 10 in operative position, has attached thereto a cam plate or dog 86, which engages with the throw-out cam member 85 to rotate the arm 34 in a clockwise direction about the shaft 33 and thus move the fork 32 to the left, as viewed in Fig. 5, against the tension of the spring 41 and moving the member 25 to the left to bring the rollers 28 out of association with the member 24 and into association with the member 26. As the arm 34 moves to the right, as shown in Fig. 5, the latch 36 will engage with the bar 37 and the device will be locked in the position described.

When the lever 12 is operated to move the transmission gears out of reverse and into neutral, the latch 36 is not disturbed and therefore the braking mechanism is held out of operative position. The shaft 18 may therefore be rotated in either direction at will. This condition will continue until the lever 12 is operated to bring the transmission gearing into one of its forward speeds, and such operation will result in the movement of the latch 36 out of engagement with the rod 37, and the spring 41 will rotate the shaft 33 to bring the locking rolls 28 into operative position.

Referring now to Figs. 7 and 8, which show a further modification of my invention, 10 again represents the transmission casing having secured to the top thereof the cover 11 in which is pivotally mounted the gear shift rod 12. As a part of the transmission gearing within the casing 10 is a splined power shaft 90, which shaft has secured to the end projecting beyond the casing a flange 21 and by means of which the power shaft 90 may be attached to the usual propeller shaft. Slidably mounted on the power shaft 90 is a gear 91 which may, by proper operation of the gear shift lever 12, be moved into and out of engagement with the pinion 92 secured to and rotatable with a counter shaft 93, rotatably mounted in suitable bearings in the casing 10 and in the rear cover plate 94 thereof. The counter shaft 93 is connected to and rotates in unison with the crank shaft of the motor, as is usual. The pinion 92 is also in mesh with a gear 95 at all times and this gear 95 is secured to or formed on a hub 96 rotatably mounted on a suitable shaft (not shown). Also formed on the hub 96 (though not shown) is a gear which meshes with a gear (not shown) on the power shaft 90 for imparting to such power shaft a rotation, the reverse of that ordinarily given to it during the forward motion of the vehicle to which the entire device may be attached. Keyed to the counter shaft 93 is a gear 97 which is adapted to be, and ordinarily is, in mesh with a pinion 98 slidably, though rotatably mounted, on the power shaft 90. Secured to one face of the gear 97 is a member 99 provided on its face with a plurality of tapered recesses 100 and with a centrally located recess in which fits a cylindrical boss 101 formed on the inner face of the cover plate 94 of the casing 10. Within the recesses 100 are located rollers 102 and normally in engagement with the rollers 102 are spring pressed plungers 103 carried in the member 99. The spring pressed plungers 103 constantly urge the rollers 102 toward the tapered end of the recesses 100 and, therefore, constantly tend to move such rollers into binding action between the surface of the tapered recesses 100 and the outer surface of the cylindrical member 101. As the power shaft 90 normally rotates in a forward movement of the vehicle in a counter clockwise direction, as viewed in Fig. 8, the gear 97 and, therefore, the member 98 rotate in a clockwise direction and such rotation tends to force the rollers 102 out of the tapered portion of the recesses 100 against the tension of the spring pressed plungers 103 and, therefore, the member 99 rotates freely on the stationary member 101. The pinion 98 has formed at one end thereof an annular groove 104 in which fit oppositely located pins 105 secured to the lower ends of the arms of a yoke 106 secured to a shaft 107 rotatably mounted in the casing 10. One end of the shaft 107 extends laterally outward from the casing 10 and has secured thereto an arm 108, to the lower end of which is attached one end of a spring 109. The other end of this spring 109 is attached to any convenient portion of the casing 10 and tends to rotate the shaft 107 in a counter clockwise direction or in such a direction as to move the lower end of the yoke 106 rearwardly of the casing 10 or to the right, as shown in Fig. 7, so as to bring the pinion 98 into mesh with the gear 97.

Slidably mounted in the casing 10 are the usual shift rods 110 and 111 respectively and which co-operate with the shift lever 12 with proper yoke members (not shown) to shift the gearing within the casing 10 to obtain the usual, first, second and third speeds forward and the reverse speed. Secured to one of the shift rods, as the rod 111, is a member 112 adapted to be brought into and out of engagement with a cam plate 113, secured to an extension 114 formed at the upper end of the forked member 106 and it will be obvious from an inspection of the drawings that if such shift rod 111 is moved rearwardly, the member 112 will engage with the member 113 and rotate the shaft 107 so as to move, by means of the forked member 106, the gear 98 out of engagement with the gear 97. Each of the shift rods 110 and 111 is provided with a recess 115 which is in transverse alinement when the shift rods 110 and 111 are in the neutral position, or in the position shown in Fig. 7, and in this position, are adapted to receive a rod 116, secured to and extending laterally outward from each side of one end of an angular arm 117 that is pivotally mounted at 118ª on the forked member 106. Formed on the member 117 is a locking notch 118 adapted to engage with a rod 119 secured to and extending inwardly from one side of the casing 10 and such notch 118 can be brought into engagement with the rod 119 when the shift rods 110 and 111 are in neutral position and under certain other circumstances, to be hereinafter described.

As shown in Figs. 7 and 8, the mechanism is assumed to be in the neutral position, or in a position where the shift lever 12 has been moved to neutral after the mechanism has been brought to rest. Under these conditions, the power shaft 90 is disconnected from the main crank shaft of the motive power except through the gears 97 and 98. If, under these conditions, the vehicle on which the device is mounted moves backwardly, the power shaft 90 will be rotated in a clockwise direction, as viewed in Fig. 8, and causing therefore a counter-clockwise rotation of the member 99. Under these conditions, the rollers 102, aided by the spring pressed plungers 103, will be moved into the tapered portion of the recesses 100 and there will be a locking action by means of such rollers between the member 99 and the stationary member 101 and, therefore, there will be a braking action exerted on the power shaft 90 and rearward movement of the vehicle prevented. If, however, the vehicle has been brought to rest and the parts moved into the position shown in Fig. 7 and afterwards it is desired to reverse the ordinary direction of movement of the vehicle, the shift lever 12 is operated to bring the member 112 into engagement with the member 113 and this movement and engagement will cause a rotative movement of the shaft 107 against the tension of the spring 109 and a movement of the gear 98 out of mesh with the gear 97. When this movement takes place, the member 117 will likewise be moved so as to bring the notch 118 formed thereon into position where engagement with the transverse rod 119 may take place under certain conditions. These conditions, however, do not yet exist because of the fact that in moving the member 112 rearwardly, by the sliding movement of the shift rod 111, the body of the rod 111 adjacent to the notch 115 will move under the rod 116 attached to the angular member 117. Therefore, no downward rotative movement of such angular member 117 can take place about its pivot point 118ª. Under these conditions and with the gears 97 and 98 out of mesh with each other, rearward movement of the vehicle to which the device is attached may take place, as in this event, the member 99 rotates in a clockwise direction and no braking action, therefore, takes place between such member and the stationary member 101. Assuming now that a rearward movement of the vehicle is stopped and the shift lever 12 operated to bring the mechanism into neutral position, as the member 112 moved off the member 113, the notch 115 in the shift rod 111 came into position beneath the rod 116 on the angular member 117 and such rod 116 dropped into the notch 115 in time for the notch 118 to engage with the transverse rod 119. Therefore, the gear 98 will be maintained out of mesh with the gear 97 even though the device is in neutral position and will remain in such locked position until the mechanism has been placed in any one of its forward speeds by proper manipulation of the shift rods 110 and 111. When this occurs the end of one of the notches 115 will engage with the rod 116 and thus rotate the angular member 117 about its pivot point 118ª and moving the notch 118 out of engagement with the transverse rod 119 whereupon the spring 109 will move the gear 98 into mesh with the gear 97 and bring the reverse brake mechanisms 99, 100, 101 and 102 into operative position.

It will be noted from an inspection of the drawings that the locking rolls 28 shown in Figs. 2 and 6, and the locking rolls 102, shown in Fig. 8, are arranged in housings formed of the stationary and rotatable members and that such housings are in reality chambers larger at one end than at the other and that the locking occurs between the stationary and rotatable members when the locking rolls are moved into the smaller end of the chambers when the rotatable member rotates in the reverse direction to the normal forward direction. When, however, the rotatable member is rotating in the normal or forward direction of the device, the locking rolls 28 and 102 are moved into the larger end of the chambers in which the same are located, this movement being due to centrifugal force and as the rotatable member rotates, such locking rolls are moved out of actual physical contact with respect to the stationary member. By this construction, therefore, the wear on both the stationary members and the locking rolls is reduced to a minimum when such locking rolls are only in engagement with the stationary members when the rotatable shaft is being rotated in the reverse direction.

While I have necessarily described the preferred embodiments of my invention somewhat in detail, it is to be understood that I may vary the size, shape and arrangement of parts comprising the structures within wide limits without departing from the spirit of the invention.

Having thus described my invention, what I claim as new is:

1. In a device of the kind described, the combination with a shaft adapted to be rotated in either direction for the transmission of power, a mechanism associated therewith and normally in position to arrest movement of such shaft in one direction, means for rendering said mechanism inoperative, and a locking device independent of said last named means for maintaining such mechanism in inoperative position.

2. In a device of the kind described, including a speed gear box for the transmission of power, and having a shaft adapted to be rotated in either direction for the transmission of power, the combination of a mechanism normally connected to such shaft to automatically arrest movement thereof in one direction only, a device for rendering said mechanism inoperative, means for maintaining said mechanism in inoperative position indefinitely, and means operable by the transmission mechanism for placing said mechanism in operative position.

3. In a device of the kind described, the combination of a power shaft, a source of power, means interposed between the source of power and the power shaft for normally permitting rotation of the power shaft in one direction only, a device for controlling said latter means to permit rotation of the power shaft in the other direction, and means for holding said latter device out of operative position indefinitely.

4. In a device of the kind described, including a speed gear box for the transmission of power and having a shaft adapted to be rotated in either direction for the transmission of power, the combination of a mechanism normally connected to such shaft to automatically arrest movement thereof in one direction only, a device for rendering said mechanism inoperative, independent of said device controlling means for the speed gear box for permitting said mechanism to return to operative position, and independent means for maintaining said mechanism in inoperative position indefinitely.

5. In a power transmitting system, the combination with a transmission gearing for a motor vehicle, of a reverse brake mechanism, a power shaft rotatable in either direction by the transmission device, connections between the rotatable shaft and the reverse brake mechanism, whereby rotation of the shaft is permitted in one direction only in the normal operation of the reverse brake mechanism, means associated with the transmission device and reverse brake mechanism for putting the reverse brake mechanism out of action to permit rotation of the shaft in either direction and for maintaining the reverse brake mechanism out of action until the transmission device has been moved into one or the other of its positions to cause a forward movement of the motor vehicle.

6. In a device of the kind described, the combination of a change speed gear box for the transmission of power, having a shaft adapted to be rotated in either direction for the transmission of power, a braking device associated with said shaft to automatically arrest movement of said shaft in one direction, and controlling means operably connected to the transmission mechanism and to the reverse brake mechanism to move the reverse brake mechanism out of action to permit rotation of the shaft in either direction, and for maintaining such braking mechanism out of action until operated to move the change speed gear box into one of its forward positions.

7. In a device of the kind described, a transmission device, operating means therefor, a reverse brake device moved into and out of action by the transmission device operating means, means independent of the transmission device for locking the reverse brake device out of action, and means, operable at will, for unlocking the locking device to permit the return of the reverse brake device to operable position.

8. In a device of the kind described, a transmission device, having a reverse speed and a plurality of forward speeds, operating means for the transmission device, a reverse brake device moved into and out of action by the transmission device operating means, means for locking the reverse brake device out of action after having been put out of action until the operating means for the transmission device moves the transmission device into any forward speed.

9. In a device of the kind described, a transmission device having a reverse speed and a plurality of forward speeds, an operating means for the transmission device, a reverse brake device moved into and out of action by the transmission device operating means and out of action when the transmission device is moved into reverse speed, and means for locking the reverse brake device out of action after having been put out of action until the operating means for the transmission device moves the transmission device into a forward speed.

10. In a device of the kind described, a driving and a driven element, means associated therewith for imparting rotary motion to the driven element in either direction at will, a reverse brake device associated with the driven element for normally preventing rotation of the driven element in one direction, means for automatically moving the reverse brake device into position to permit rotation of the driven member in either direction, means to lock the same in such position, and means operable at will to permit return of the reverse brake to operative position.

11. In a device of the kind described, a transmission device, operating means therefor, a reverse brake device moved into and out of action by the transmission device operating means, means for locking the reverse brake out of action, and means operable at will for unlocking the locking means to permit the return of the reverse brake device to operative position.

12. In a device of the kind described, the combination of a driven member, means for applying power thereto to rotate the same in either direction, a locking element carried by the driven member, an abutment co-operating therewith to prevent rotation of the driven member in one direction, means constructed and arranged to permit said locking element being held out of engagement with the abutting member, means for locking said locking element out of operative relation to the abutment to permit rotation of the driven member in either direction, and means operable at will for unlocking said locking means to permit said locking element to come into operative relation with the abutment.

13. In a device of the kind described, a transmission device, including a driven shaft normally rotatable in either direction, operating means for the transmission device, a reverse brake device associated with the driven shaft and normally preventing rotation thereof in one direction, said reverse brake device being moved out of action by the said operating means simultaneously with the moving of the transmission device into reverse position, whereby rotary movement of the driven shaft in the reverse direction is permitted, and means for maintaining the reverse brake device locked out of action after the operating means has moved the transmission device into neutral position.

14. In a device of the kind described, the combination of a driven member, means for applying power thereto to rotate the same in either direction, a locking element carried by the driven member, an abutment co-operating therewith to prevent rotation of the driven member in one direction, and means constructed and arranged to permit said locking element being held out of engagement with the abutting member by centrifugal force on rotation of the driven member in the other direction.

15. In a device of the kind described, the combination of a driven member, means for applying power thereto to rotate the same in either direction, a chamber in said driven member, a locking element carried in said chamber, an abutment co-operating with said locking element to prevent rotation of the driven member in one direction, and said locking element being held out of engagement with the abutting member by centrifugal force on rotation of the driven member in the other direction.

In testimony whereof, I have signed my name to this specification.

CARL A. MATSON.